UNITED STATES PATENT OFFICE 2,410,395

ACID-CURING SYNTHETIC RESIN COMBINED WITH OLEFINE-SULFUR DIOXIDE POLYMER

Leonard Smidth, New York, N. Y., assignor to Sylvania Industrial Corporation, Fredericksburg, Va., a corporation of Virginia No Drawing. Application August 4, 1942, Serial No. 453,552

7 Claims. (Cl. 260—42)

The present invention relates to acid-curing synthetic resins containing a latent curing catalyst, and to a process for preparing and using such compositions. In particular, the invention relates to a process for preparing relatively stable acid-curing resinous condensation products containing a latent catalyst. The invention also includes correlated improvements designed to enhance the characteristics and to extend the utility of such resins.

The prerequisites of an ideal latent curing catalyst, for example, when used with a synthetic resin molding composition, are as follows: (a) the catalyst should be relatively stable at ordinary temperatures and temperatures below the ordinary curing temperatures of the synthetic resin for a substantial period of time; (b) such catalyst should be preferably substantially neutral, or only slightly acid or slightly basic at ordinary temperatures, but upon heating it should release or produce an acid or acidic substance; (c) the catalyst should be initially substantially colorless in order not to obscure the true color of the resins or the color of any pigment that may be added; (d) the catalyst should be capable of being uniformly incorporated in the resinous material; (e) the catalyst should not become acidic too soon, that is, prior to the time the resin reaches the temperatures required for proper molding, as this tends to cause the product to become unstable and also tends to cause pre-curing of the compositions. On the other hand, the decomposition of the latent catalyst should not proceed too slowly on reaching such molding temperatures, thus unduly prolonging the molding operation.

The latent curing catalyst of the invention may be considered as an accelerator, which upon heating becomes activated to release or produce an acid or an acidic substance for advancing the reaction of the partially-reacted acid-curing synthetic resin. The term "latent catalyst" or "latent curing catalyst" as used in the art defines substances which are relatively stable, and which are neutral or only slightly acid or basic at atmospheric temperatures, but which become activated at a curing temperature to produce a substance having acidic properties.

It is a general object of the present invention to provide a latent curing catalyst for incompletely-reacted acid-curing synthetic resin compositions, which catalyst will be relatively stable at ordinary atmospheric temperatures, and otherwise substantially fulfill the requirements of an ideal latent curing catalyst.

It is another object of the present invention to provide a process in which an incompletely-reacted acid-curing synthetic resin is combined with a latent catalyst, which catalyst becomes acidic upon heating to elevated temperatures and which can be uniformly incorporated with said acid-curing synthetic resin.

Another object of the invention is to provide a latent curing catalyst for curing urea-formaldehyde reaction products which will be simple to incorporate, stable until the reaction products are cured, and which will not discolor the resins produced.

It is a specific object of the invention to provide an acid-curing composition comprising a urea-formaldehyde condensation product and a latent curing catalyst and which is adapted for a wide variety of uses.

Other objects of the invention will in part be obvious and will in part appear hereinafter.

According to the present invention there is provided a composition comprising an incompletely-reacted synthetic resinous material which requires the presence of an acid at elevated temperatures as a curing agent, and a latent curing catalyst comprising a polysulfone which liberates an acidic substance at an elevated temperature. The invention also includes a process whereby a latent curing catalyst comprising a polysulfone which decomposes to form an acidic substance at elevated temperatures is incorporated in an incompletely-reacted synthetic resin composition to form a product which, upon heating, forms an advanced reaction product of said incompletely-reacted synthetic resin, due to the acidic substance produced in situ by decomposition of the polysulfone at an elevated temperature.

The expression "incompletely-reacted synthetic resin," as used in the specification and appended claims with reference to resinous materials which are capable of further curing, is intended to include any such product in a state prior to complete polymerization, as simple addition products or condensation products thereof, as well as such materials prior to initial reaction, as unreacted mixtures of the several ingredients which are employed in forming such resinous materials.

For purposes of illustration, the present invention will be described with reference to acid-curing synthetic resins selected from the class consisting of those formed by condensation of aldehydes, such as formaldehyde, acetaldehyde, propionaldehyde, crotonaldehyde, benzaldehyde, furfural and the like, with amines or amides, such as urea, thiourea, guanidine, methyl urea, acetyl urea, melamine, cyanamide, dicyanodiamide, biuret, semi-carbazide, aniline and derivatives of aniline, and with phenolic compounds, such for example as phenol, resorcinol and cresol. The invention will be particularly described with reference to reaction products formed of urea and formaldehyde which are characterized by requiring the presence of an acidic substance at elevated temperatures to advance the condensation and/or polymerization.

The invention accordingly comprises (1) a composition possessing the characteristics, properties and the relation of components capable of forming final hardened resins, (2) the process involving the several steps and the relation of the steps with respect to each other and the final hardened product possessing the features, properties and the relation of components as will be exemplified in the following detailed description, and the scope of the invention will be indicated in the claims.

Polysulfones as a class may be employed as latent catalysts.

The polysulfones employed as latent curing catalysts in the present invention may be formed by reacting sulfur dioxide, sulfones, sulfur halides and the like, with unsaturated organic compounds of the nature of olefins, acetylenes, and polyfunctional unsaturated organic compounds. The unsaturated organic compounds include, for example, the mono-olefins (including the pure single olefin hydrocarbon), the di-olefins, the conjugated di-olefins, mixed olefins, isomeric olefins and the like. Among the acetylenes there may be used acetylene per se as well as alkyl and aryl acetylenes. Among the polyfunctional unsaturated compounds there may be used the alcohols, ethers, acids and halogen derivatives of the olefins. The polysulfones are of themselves, in many cases, products of a plastic, resinous nature. The polysulfone reaction may be carried out in the presence of daylight or other actinic light, or in the presence of catalysts such as ozone, oxygen, organic peroxides, peroxidized ether, paralydehyde, ascaridole, nitrous oxide, nitric oxide, salts of monovalent copper such as cuprous chloride and the like, at sub-atmospheric, normal or elevated temperatures and pressures.

Polysulfones of the type used in the present invention and their production are described generally in an article by Snow and Frey, in Industrial and Engineering Chemistry, volume 30, pages 176–182 (1938).

The polysulfones suitable for use in the present invention are those which are ordinarily stable at atmospheric or room temperatures, but which, upon being subjected to elevated temperatures including the curing temperatures of the acid-curing synthetic resins of the class described, break down or decompose to yield acidic substances, an example of which is gaseous sulfur dioxide. A small amount of water is usually present or formed during the curing of such resins, and the liberated sulfur dioxide forms an acid with this water.

During the curing operation the polysulfone may decompose partially or completely, and it is to be understood that the product resulting from curing may comprise a resin containing the decomposition products of the polysulfone, or the final product may comprise mixtures or copolymers of the undecomposed polysulfone with the resin. The decomposition products of the polysulfone do not appear to impair the nature or quality of the resin cured therewith.

For purposes of illustration only, and not by way of limitation, the invention will be described hereinafter with reference to urea-formaldehyde condensation products containing an olefin-sulfur dioxide polysulfone as the latent curing catalyst, but it is to be understood that the scope of the invention includes mixtures of polysulfones with the acid-curing synthetic resins.

Among the factors which enter into the formation of the final hardened product using polysulfones as latent catalysts, the most important factor is the quantity of the polysulfone present which is converted to an acidic substance, which quantity is determined by the temperature to which the mixture is heated. The polysulfones as a class tend to decompose to some extent at temperatures slightly above room temperature. Therefore, instead of selecting a particular polysulfone which will completely decompose at the curing temperature employed, one may use a larger quantity of any polysulfone which decomposes partially at a lower temperature. In general, in order to obtain the same degree of acidity, a larger quantity of any particular polysulfone is required when subjecting the mixture to lower temperatures as compared to higher temperatures, and vice versa. Other factors include the specific polysulfone employed, the pH required during curing and the degree of polymerization desired in the final product.

In compositions to be used in molding the latent catalyst may be a polysulfone which substantially completely decomposes to release an acidic substance at a temperature between 120° C. and 160° C. or alternatively one may use a larger quantity of a polysulfone which partially decomposes at a lower temperature. However, in forming castings, coatings, and laminates with urea-formaldehyde reaction products or other acid-curing synthetic resins, there may be employed polysulfones which decompose to liberate an acidic substance under the conditions of temperature and/or pressure employed in forming such products.

For example, in laminating wood veneers by "hot" pressing with an adhesive composition comprising a urea-formaldehyde condensation product containing a small amount of the latent catalyst, there may be employed a polysulfone which substantially completely decomposes at about 80° C. to 145° C. or a larger quantity of one which partially decomposes at a lower temperature. In laminating wood veneers by a "cold" pressing operation, wherein comparatively more moisture is present in the adhesive, there may be used larger quantities of the polysulfone. In this case the moisture acts to break down the polysulfone over a period of time at the lower temperature and produce a better bond than without the catalyst being present.

For use in forming castings requiring up to three days curing, there may be employed as a latent catalyst a polysulfone substantially completely decomposing at about 60 to 80° C., or a larger quantity of one which decomposes partially at a lower temperature.

For creaseproofing textile materials with a dilute aqueous solution of a substantially neutral urea-formaldehyde condensation product, there is employed in such solution a polysulfone which decomposes completely at about 120° C. to 160° C. or a larger quantity of one which partially decomposes at a lower temperature.

In treating textile materials, it is often desirable to treat with an emulsion comprising the polysulfone, thereafter treating the textile with an acid-curing type synthetic resin and passing the treated textile through hot rollers to decompose the polysulfone and cure the resin in situ.

In forming emulsions of the polysulfones, a stable emulsion may be prepared by dissolving the polysulfone in a mildly alkaline soap solution. Alternatively, the polysulfone may be dissolved in a stronger alkaline solution, for example, aqueous NaOH solution. The strong alkali degrades the polysulfone to form degradation products thereof, and the solution may then be applied to a textile material together with an acid-curing type synthetic resin. Upon heating the textile material, the degradation products of the polysulfone will decompose further to release an acidic substance and cure the resin on the textile.

For the present invention it is only necessary that the latent curing catalyst of the class described be substantially stable at ordinary atmospheric temperatures or only slightly decomposable at such temperatures, for example between 15° C. and 32° C., but capable of decomposing to an extent which liberates an acidic substance at elevated temperatures not above the final curing temperature. It is preferred to employ a sulfur dioxide-olefin polymer having not less than 2 and not more than 9 carbon atoms in the straight chain.

The latent catalyst may be combined with the urea-formaldehyde composition while the latter is in the form of a dry powder or is in solution. The polysulfones are normally insoluble in water, but soluble in organic solvents. Therefore, when it is desired to mix the polysulfones with the water-soluble resins, the polysulfone may be first formed into an aqueous emulsion and then mixed with the aqueous solution of the water-soluble resin. Such aqueous compositions may be employed for coating, laminating and as adhesives. When employing resins which are soluble in organic solvents, the polysulfones may be dissolved in such organic solvents for the resins or in organic solvents miscible therewith. Suitable solvents for the mixture of organic solvent-soluble urea-formaldehyde resins and the polysulfones are, for example, acetone, ethyl acetate, cyclohexanone, chloroform, acetophenone, 1,4-dioxane, benzene and the like. Compositions thus produced may be employed in lacquers, paints, laminates, inks, moldings, castings and the like.

In combining the polysulfone with the urea-formaldehyde, it is only necessary in most cases to add a small portion of said catalyst to the urea-formaldehyde, before, during or after initiating the reaction between the urea and the formaldehyde, or before or after the addition of cellulosic fillers, inert fillers, dyes, pigments, binding agents, lubricants and the like. Alternatively, such additional substances may be added to the latent catalyst and the mixture then incorporated with the urea-formaldehyde reaction product.

The latent curing catalyst may be added in amounts ranging from 0.01% to 15% based on the dry weight of the acid-curing synthetic resin composition. When making molding compositions which are to be cured at relatively high temperatures, e. g., 145° C., the amount of the polysulfone should be relatively small, for example, from .01 to 1%, based on the weight of the urea-formaldehyde reaction product. In the case of coatings and lacquers which are not subjected to high baking temperatures, e. g., above 100° C., but which are dried at relatively low temperatures, e. g., below 75° C., the amount can be much larger, for example, from 1% to 15%.

The following examples are given to illustrate the manner in which the latent curing catalyst of the invention may be utilized with acid-curing synthetic resins, but the invention is not to be considered as limited to these examples.

*Example 1.*—1.0 mol of urea was reacted with 1.5 mols of formalin. The pH of the solution was adjusted to 6.5 with the addition of a suitable quantity of ammonia. The solution was kept at a temperature of about 25° C. for 30 minutes, after which time it was mixed with a comminuted purified paper pulp in an amount equal to the weight of the urea used. The mixing was carried out in a Werner & Pfleiderer mixer equipped with a jacket which was heated with steam so that the temperature of the mass during mixing was maintained between 60 and 70° C. The top of the mixer was kept open so that part of the water present evaporated during the mixing operation. The mass was then dried with or without additional heating, to give a molding composition which had the desired flow. The higher the temperature and the longer the period of heating, the stiffer the flow of the compositions and vice versa.

The resultant dried molding composition was then ground to a fine powder in a pebble or ball mill with 0.5% zinc stearate and 0.2% of finely ground 2-butene-sulfur dioxide polymer. The mixing was completed in less than 15 minutes because the materials had been previously finely ground separately. The resultant molding composition cured when hot pressed giving a molded product with a substantially lower water absorption value when boiled in water compared to an identical product molded under the same conditions but without the addition of the olefin-sulfur dioxide resin.

*Example 2.*—The reaction was carried out the same as in Example 1, but in place of the latent catalyst therein there was used a polysulfone comprising polymerized 1-pentene-sulfur-dioxide.

*Example 3.*—1.05 mols of urea were reacted with 2 mols of formaldehyde (as 40% by volume aqueous formalin) in two stages, by reacting in a vessel large enough for the subsequent addition of the material added in the second stage, 2 mols of formaldehyde with 1 mol of urea at a pH value of about 7.0. After the initial product was formed there was added thereto a small amount of formic acid to bring the pH down to between 4.0 and 5.0, and heating was continued under reflux at boiling temperature. In a second vessel there was mixed 1.5% phthalic anhydride, 0.05 mol of urea, and an amount of butanol equal in volume to the formalin initially employed. This mixture was then heated to approximately boiling temperature and added to such product in the first vessel when the product had been reacted to a point wherein the solution attained a slight rise in viscosity as determined by a standard pipette (e. g., a pipette delivering 25 cc. in 25 seconds at 25° C.).

The combined mass was then placed on a distilling appaartus and the vapors of a mixture of butanol and water were condensed by means of a condenser which separated the water from the butanol. The water was taken off and the butanol returned to the distilling vessel so that a constant volume of butanol was maintained, the distillation being continued until water no longer distilled off. Approximately one-half of the butanol was then removed and replaced with an equivalent amount of xylol. The mass was then cooled. If desired the product may be dried in known manner and formed into a powder. There was added to the solution from 1.0 to 5.0%, based upon the dry weight of the resin, of a polysulfone comprising 1-butene-sulfur dioxide dissolved in acetone.

The product was employed as a coating composition which after application to a surface was baked at a temperature of 90° C. to 260° C. to set the resin. The polymer set quicker and was more moisture-resistant than a coating composition made up exactly the same but without the use of the polysulfone catalyst. The composition had better package stability than a similar composition containing other latent catalysts or acid.

*Example 4.*—The reaction was carried out the same as Example 3, but in place of the latent catalyst therein there was used a polysulfone comprising 1.0% to 5.0%, based upon the total weight of the resin, of a butadiene-sulfur dioxide resin dissolved in acetone. The composition was employed as a coating which when baked at from 90° C. to 260° C. resulted in a polymerized product which set quicker and was more inert than a coating composition made up exactly the same but without the use of the polysulfone.

*Example 5.*—The process was carried out as in Example 1, but in place of the latent catalyst employed therein, there was used a polysulfone catalyst comprising 1.0% to 2.0% of 3-cyclohexylpropene-sulfur dioxide. The resulting condensate was mixed with a pigment and formed a hard, infusible coating when baked at 125° C. to 150° C.

*Example 6.*—A urea-formaldehyde resin was prepared by reacting 1.8 mols of formaldehyde with 1.0 mol of urea and sufficient sodium hydroxide was added to give a pH of about 9.0 and allowing the solution to stand at room temperature to the point at which it began to become turbid. Thereupon sufficient formic acid was added to bring the pH down to 8.0. To 25 parts of this mixture there was added an aqueous emulsion of 1-butene-sulfur dioxide resin emulsified by means of a suitable emulsifying agent, such as Turkey red oil, a soap, etc., to give 1% of the polysulfone on the weight of the resin. Cloth, e. g. rayon, was padded with this solution so that it took up a weight of solution equal to the original weight of the cloth. The cloth was then dried at a relatively low temperature and cured for several minutes at 150° C. After curing the cloth was finished in a known manner. The resulting fabric was found to have good crush resistance which did not substantially change after repeated washings.

*Example 7.*—The reaction was carried out between urea and formaldehyde as in Example 6, but in place of the sulfur dioxide polymer used therein, there was used a polysulfone comprising sulfur dioxide-butadiene polymer.

*Example 8.*—Instead of following the procedure described in Example 6, a cotton cloth was first treated with an emulsion containing the polysulfone (which emulsion was prepared as described in Example 6), and the treated cloth, either before or after drying, was then printed with a textile printing paste comprising a urea-formaldehyde resin of the water-soluble type as described in Example 6. The printed cloth was then dried at a relatively low temperature and cured for several minutes at 160° C., after which it was washed and finished in a known manner.

*Example 9.*—Instead of using soaps or other emulsifying agent as in Example 6, degradation products of the polysulfone may be used instead. These have emulsifying and wetting properties and are prepared by breaking down the polysulfone by the use of a high temperature under pressure or by the use of strong alkalis. If sufficient amount of the degraded polysulfone is used regardless of whether the solution is neutral or alkaline, heating of the degraded polysulfone will cause further formation of acids. Formation of acid takes place during the setting of the resin as carried out in Example 6, after the impregnated cloth is subjected to heating.

*Example 10.*—In preparing a molding composition as described in Example 1, the polysulfone used comprised a cyclohexylpropyne-sulfur dioxide polymer which was added to the cellulose filler prior to the mixing of such filler with the urea-formaldehyde condensate.

*Example 11.*—The reaction was carried out between urea and formaldehyde as in Example 1, but the catalyst used was a polyfunctional olefin-sulfur dioxide polymer comprising polymerized sulfur dioxide-ortho-allyl phenol.

*Example 12.*—2.15 mols of commercial formaldehyde were reacted with 1.0 mol of urea by boiling under a reflux condenser at a pH of about 7.0 for 10 minutes after which time sufficient formic acid was added to bring the pH to 4.5. The reaction was continued under reflux until a slight rise in viscosity was noted and then the pH of the mass was adjusted to about 7.0 with the addition of sufficient sodium hydroxide. There was then added to 100 parts of the solution, 1 part of a solution of 1-butene-sulfur dioxide polymer dissolved in 10 parts of acetone and the resulting dispersion was applied to the surfaces of three pieces of wood veneer. The veneers were then pressed together at a pressure of between 1,000 and 1,500 pounds per square inch at a temperature of 120° C. It was found that the adhesive had formed a strong water resistant bond between the individual plies.

*Example 13.*—As an alternative to the procedure outlined in Example 12, the solution of the polysulfone in acetone may be first applied to the surface of the coated veneer and plies thus treated may then be coated with the urea-formaldehyde resin not containing a catalyst. The plies are then placed together and otherwise treated as in Example 12.

*Example 14.*—1.0 mol of melamine was reacted with 4 mols of commercial formaldehyde (37% aqueous solution) under a refluxing condenser by boiling for 15 minutes. The water was then removed by evaporation at a temperature below 40° C., while maintaining the pH of the mixture at about 6.7 to 7.3 through the addition of sufficient ammonium hydroxide or formic acid as required. The mass was then mixed with sufficient alpha cellulose filler to give a ratio of 50 parts resin and 50 parts cellulose. The mass was dried to a point where the material had the desired flow after which the mass was pulverized in a pebble mill. There was then added 2% of a polysulfone latent catalyst comprising 1-nonene-sulfur dioxide polymer as a fine powder. The mixture was then placed into a compression mold and heated to about 150° C. for a few minutes at a pressure of about 3,000 pounds per square inch. The polysulfone catalyst decomposed to release an acidic substance which caused the further polymerization of the melamine-formaldehyde forming a hard, infusible product.

*Example 15.*—30 parts of dicyanodiamide were reacted with 58 parts of formalin (38% aqueous formaldehyde solution) in the presence of about 12.6 parts of formic acid. The mixture was boiled for several hours under a reflux condenser, whereupon the pH was adjusted to 7.0 and the mass mixed with wood flour. The product was then thoroughly dried by passing air through the mass until the mass had the proper flow characteristics. The dried product was then ground in a pebble mill, to which there was added 0.5% to 1.0% of a polysulfone catalyst comprising a co-polymer of butene-1, allyl alcohol and sulfur dioxide in the form of a fine powder. The mixture of powdered resin containing the latent catalyst was found to be quite stable upon standing over a long period of time, but when introduced into a mold and subjected to about 3,000 pounds per square inch at 140° C. there was produced a hard, clear, infusible product.

In considering the foregoing examples it will be observed that many different methods may be employed for combining the latent catalyst with the acid-curing resin. For example, the latent catalyst may be added during or immediately after the formation of the resin, or prior to molding, casting, laminating and the like. Alternatively, a textile, paper, wood or other absorbent material may be impregnated with a solution of the latent catalyst and thereafter the treated material may be coated or impregnated with the acid-curing resin composition. When the impregnated material is heated the polysulfone will liberate an acidic substance in situ, thereby curing the resin applied to the material.

Not only may the polysulfones be used alone as the latent catalyst, but they may also be employed in admixture with other latent catalysts compatible therewith.

Furthermore, the sulfones used in the present invention are characterized by a tendency to generate or release an acid substance when they are mechanically worked, particularly when the mechanical working is carried out at an elevated temperature. This characteristic is an asset when the resin composition is to be used for transfer molding, in which operation the resin composition undergoes considerable mechanical working during the molding operation.

To retard or prevent any premature action of the latent catalyst in resin molding compositions prior to use, the catalyst can be comminuted and coated with a mold lubricant or other inert film-forming material. For example, a mixture of the polysulfone and mold lubricant, such as zinc stearate, may be mixed in a ball mill, care being taken not to work the mixture more than necessary for proper coating of the particles of the polysulfone with the lubricant. As an added precaution, when using the polysulfone catalyst with an acid-curing type resin at elevated temperatures, the temperature of the mold may be so controlled as to prevent premature decomposition of the polysulfone. Conversely, a mixture of resin and cellulose filler may be comminuted and the particles thereof coated with the mold lubricant. In either case the mold lubricant serves to prevent direct contact of the latent catalyst with the resin.

It has also been found that the polysulfones, when used as latent catalysts, may not entirely decompose, and thus together with the acid-curing resins of the class described produce final products having improved properties. The undecomposed portions of the polysulfones being of a resinous nature per se thus co-polymerize with the acid-curing resins during the curing to form conjoint polymers which have properties and characteristics which differ from those of either of the components.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A composition comprising an incompletely-reacted acid-curing synthetic resin combined with a latent curing catalyst comprising an olefin-sulfur dioxide polymer.

2. A composition comprising an incompletely-reacted urea-formaldehyde reaction product combined with a latent curing catalyst comprising an olefin-sulfur dioxide polymer.

3. A composition comprising an incompletely-reacted urea-formaldehyde reaction product combined with a latent curing catalyst comprising a polymer resulting from the reaction of sulfur dioxide with a mono-olefin having not less than 2 and not more that 9 carbon atoms in the straight chain.

4. A liquid coating composition comprising an incompletely-reacted urea-formaldehyde reaction product combined with a latent curing catalyst comprising an olefine-sulfur dioxide polymer.

5. An aqueous adhesive comprising an incompletely-reacted urea-formaldehyde reaction product combined with a latent curing catalyst comprising an olefine-sulfur dioxide polymer.

6. A molding composition comprising an incompletely-reacted urea-formaldehyde reaction product combined with a latent curing catalyst comprising an olefine-sulfur dioxide polymer.

7. In a process for forming a resin the steps comprising mixing an incompletely reacted acid-curing synthetic resin with a latent curing catalyst comprising an olefine-sulfur dioxide polymer, thereafter heating said mixture to an elevated temperature to decompose the said polymer, thereby producing an acid substance in situ to cure said incompletely reacted acid-curing synthetic resin.

LEONARD SMIDTH.

Certificate of Correction

Patent No. 2,410,395.　　　　　　　　　　　　　　　　　　October 29, 1946.

LEONARD SMIDTH

It is hereby certified that the above numbered patent was erroneously issued to "Sylvania Industrial Corporation, of Fredericksburg, Virginia, a corporation of Virginia," as assignee of the entire interest therein, whereas said patent should have been issued to the inventor *Leonard Smidth*; and that the said Letters Patent should be read with this correction therein that the same may conform to the record of the case in the Patent Office.

Signed and sealed this 15th day of April, A. D. 1947.

[SEAL]

LESLIE FRAZER,
　　　　　　　　　　　　　　　　　　　*First Assistant Commissioner of Patents.*